US009156519B2

(12) United States Patent
Ripa

(10) Patent No.: US 9,156,519 B2
(45) Date of Patent: Oct. 13, 2015

(54) DAMPING STRUT FOR A BICYCLE

(76) Inventor: Thomas Ripa, Herrsching (DE)

( * ) Notice: Subject to any disclaimer, the term of this patent is extended or adjusted under 35 U.S.C. 154(b) by 493 days.

(21) Appl. No.: 13/458,780

(22) Filed: Apr. 27, 2012

(65) Prior Publication Data
US 2013/0032979 A1 Feb. 7, 2013

Related U.S. Application Data

(60) Provisional application No. 61/480,583, filed on Apr. 29, 2011.

(51) Int. Cl.
*F16F 9/48* (2006.01)
*B62K 25/04* (2006.01)
*F16F 9/06* (2006.01)

(52) U.S. Cl.
CPC .............. *B62K 25/04* (2013.01); *F16F 9/063* (2013.01); *F16F 9/48* (2013.01); *B62K 2025/048* (2013.01)

(58) Field of Classification Search
CPC .............. F16F 9/36; F16F 9/48; F16F 9/486; F16F 9/50; F16F 9/512; F16F 9/5126
USPC .............. 188/284, 289, 286, 313, 318, 322.2, 188/322.13; 267/64.15, 64.26
See application file for complete search history.

(56) References Cited

U.S. PATENT DOCUMENTS

| 3,399,882 A | | 9/1968 | Hausmann | |
|---|---|---|---|---|
| 3,621,950 A | | 11/1971 | Lutz | |
| 4,054,277 A | * | 10/1977 | Sirven | 267/35 |
| 4,749,068 A | * | 6/1988 | Sirven | 188/269 |
| 6,715,744 B2 | * | 4/2004 | Bell | 267/64.15 |
| 7,234,576 B2 | | 6/2007 | Sirven | |
| 8,567,576 B2 | * | 10/2013 | Ripa | 188/322.13 |
| 2002/0175035 A1 | | 11/2002 | Achenbach | |
| 2010/0244340 A1 | * | 9/2010 | Wootten et al. | 267/64.15 |
| 2011/0147148 A1 | * | 6/2011 | Ripa | 188/322.13 |

FOREIGN PATENT DOCUMENTS

| DE | 1775415 | 8/1968 |
|---|---|---|
| DE | 1505522 | 4/1970 |
| DE | 3202967 A1 | 10/1982 |
| DE | 4022099 C1 | 12/1991 |
| DE | 10122729 A1 | 11/2002 |
| DE | 60310903 T2 | 10/2007 |
| GB | 2095363 A | 9/1982 |

* cited by examiner

*Primary Examiner* — Nicholas J Lane
(74) *Attorney, Agent, or Firm* — Edell, Shapiro & Finnan, LLC

(57) ABSTRACT

A damping strut for a bicycle has a hydraulic shock absorber having a damper volume filled with incompressible damping fluid, a pressure application device that detects the current displacement state of the damping strut, and at least one disk valve. When the damping strut is displaced, the damper volume changes so that the damping fluid flows, creating a damping force which counteracts the displacement, through the disk valve. A control piston is coupled to the disk valve in order to vary the degree of opening of the disk valve. Control piston pressure can be applied by the pressure application device with a compressible control fluid, dependent on the displacement state detected by the pressure application device, such that on detection of a pre-determined displacement state of the damping strut, the disk valve is pre-tensioned in the closing direction thereof, so that the damping force is increased.

28 Claims, 15 Drawing Sheets

DAMPING STRUT FOR A BICYCLE

This application claims benefit of U.S. Provisional Application No. 61/480,583, filed Apr. 29, 2011, which is incorporated in its entirety into this application by reference.

FIELD OF AND BACKGROUND OF THE INVENTION

The present invention relates to a damping strut for a bicycle.

A damping strut for a bicycle, such as a trekking bicycle or a mountain bicycle or other land vehicles is conventionally known in combination with a suspension strut as a wheel suspension. Conventionally, the damping strut is configured in a hydraulic design, wherein the damping strut is, for example, a single-tube damper filled with a damping fluid. Mounted longitudinally displaceable in the single-tube damper is a damper piston for displacing the damping fluid, the damping piston having a plurality of damping apertures. When the damping strut travels in and out, the damping piston is displaced in the single-tube damper so that the damping fluid is displaced by the damping piston such that the damping fluid flows through the damping apertures. The flow of damping fluid in the single-tube damper, particularly through the damping apertures is subject to losses, with the result that a damping force is produced which counteracts the displacement of the damping strut.

When the bicycle is used in a variety of driving situations, demands are placed on the damping strut, particularly in respect of the level of the damping force, with which riding the bicycle with safety and a high degree of comfort is possible. It is therefore desirable, if, for example, a wheel passes through a pothole, that both when the wheel passes into the pothole and when the wheel passes out of the pothole, the damping force is as small as possible. It is also desirable that, for example, when passing over an obstacle, as the wheel rides up onto the obstacle, and the damping strut is elastically contracted, the damping force increases progressively, particularly advantageously in the last third of the maximum stroke of the damping strut, thus preventing the danger that the damping strut travels beyond the maximum stroke thereof and consequently "bottoms" and, as the wheel rides off the obstacle, as the damping strut expands elastically, the damping force is as high as possible so that the horizontal position of the bicycle remains unchanged on passing over the obstacle. It is also desirable that, if a person is seated on the bicycle and the wheel suspension units yield under the weight of said person, the demands placed on the damping force are also sufficiently achievable. In the case, particularly, of damping struts for bicycles or other lightweight vehicles, it is greatly advantageous if, due to the very large rider mass relative to the vehicle mass, the damping forces of the damping strut are dependent on a gas pressure of a gas pressure spring acting in parallel with the damping strut and pre-settable by the rider, in particular to adjust to the mass of the rider, and the level of the damping forces therefore adapt automatically in the correct proportion to the spring stiffness of the gas pressure spring strut, whilst retaining the characteristic stroke-dependent response thereof.

OBJECTS AND SUMMARY OF THE INVENTION

It is an object of the invention to provide a damping strut for a bicycle such that the bicycle equipped with the damping strut can be ridden with safety and a high degree of comfort, as well as being easy to operate.

The inventive damping strut for a bicycle has a hydraulic shock absorber which comprises a damper volume filled with an incompressible damping fluid, a pressure application device which is configured to detect the current displacement state of the damping strut, and at least one disk valve, and is designed such that when the damping strut is displaced, the damper volume changes so that the damping fluid flows, creating a damping force which counteracts the displacement, through the at least one disk valve which comprises a control piston which is coupled to the disk valve in order to vary the degree of opening of the disk valve and to which control piston pressure can be applied by the pressure application device with a compressible control fluid, dependent on the displacement state detected by the pressure application device, such that on detection of the pre-determined displacement state of the damping strut, the disk valve is pre-tensioned in the closing direction thereof, so that the damping force is increased.

The pre-determined displacement state is, for example, the state of the spring strut when said strut begins to be compressed, for example, during riding up of the bicycle onto a curbstone. Thus, on riding up onto the curbstone, this is detected by the pressure application device as the pre-determined displacement state, so that control fluid is applied to the control piston such that the degree of opening of the disk valve is reduced. Based on this reduced degree of opening of the disk valve, further flow losses are incurred in the damping fluid flow, so that on further collapse of the damping strut, the damping force is increased. If, for example, when the bicycle passes through a small pothole, the pre-determined displacement state of the damping strut is not reached so that, in this travel situation, the pre-determined displacement state is not detected by the pressure application means, the degree of opening of the disk valve remains large so that the damping force is small or zero, with the result that the movement through the small pothole remains effectively undamped. With regard to the ride kinematics of the bicycle, the curbstone can be ridden over and the small pothole can be passed through, both with a reliably comfortable ride, so that the safety and comfort afforded by the bicycle equipped with the inventive suspension strut are both high.

The pressure application device preferably has a control fluid reservoir which is configured such that the pressure of the control fluid is increased as the stroke of the damping strut decreases. It is also preferred that the damping strut comprises a gas pressure spring which is connected in parallel with the shock absorber and has a spring volume which is filled with a compressible spring fluid, wherein the spring fluid is the control fluid and the spring volume is the control fluid reservoir. Since the control fluid is compressible and the damping fluid, in particular, is incompressible, the control piston is elastically cushioned by the control fluid. The degree of opening of the disk valve is therefore adjusted on or following detection of the pre-determined displacement state with regard to the compressibility of the control fluid and the volume thereof applied to the control piston, depending on the flow rate or the mass flow rate of the incompressible damping fluid through the disk valve. Thus, for example, if the damping strut is rapidly collapsed, the disk valve is slightly pushed open by the damping fluid, such that the mass flow rate of the damping fluid through the disk valve is increased. As a result, the damping force is lessened, so that a level of damping by the damping strut is achieved which is matched to the respective travel situation for the bicycle. If, for example, the control fluid were to be incompressible, then given unchanging control fluid volumes, the position of the control piston and thus the degree of opening of the disk valve would be decoupled from the collapsing rate of the damping strut. Since the degree of opening of the disk valve is controlled by the collapsing rate of the damping strut, the bicycle equipped with the damping strut affords safe and comfortable travel.

Preferably, the control piston has a positive side, at which the pressure of the control fluid increases the pre-tension of the disk valve in the closing direction thereof, and a negative side, at which the pressure of the control fluid lessens the pre-tension of the disk valve in the closing direction thereof. The control fluid is preferably applied to the control piston by the pressure application device at the positive side and/or the negative side such that, on displacement of the damping strut before the detection of the pre-determined displacement state, the pressure difference in the control fluid across the control piston is constant and, once the pre-determined displacement state is detected, said pressure difference increases according to the degree of collapse of the damping strut. From the zero position of the damping strut as far as the detection of the pre-determined displacement state, the pressure difference of the control fluid across the control piston is preferably constant, particularly zero. It is advantageously achieved with these preferred embodiments of the inventive suspension strut that, starting from a negative displacement which becomes established when a person sits on the bicycle, when passing through a pothole with the bicycle, the damping force is constant, particularly zero, and when riding up onto a curbstone with the bicycle, the damping force increases and, when riding down off the curbstone, the damping force remains constant at the high level at which said force was last greatest when riding up onto the curbstone.

The negative side is preferably exposed to the atmosphere so that the disk valve can be pre-tensioned with the control piston. Alternatively or additionally, the surface area of the positive side is preferably greater than that of the negative side, so that the disk valve can also be pre-tensioned with the control piston. If the disk valve is pre-tensioned, then as the control fluid flows through the disk valve, the control fluid is subject to flow losses, with the result that a base level of the damping force is achieved.

The pressure application device preferably comprises a positive slider linkage and a positive slider with open and closed slider positions, which is arranged at the positive side for applying pressure to the control piston such that through actuation of the positive slider linkage, while separating the positive side from the control fluid reservoir, a positive volume can be isolated at the positive side with the positive slider. As soon as the positive volume is isolated on the positive side, the control fluid is enclosed in the positive volume and thereby acts on the control piston as a constant gas cushion. In this way, the control piston is elastically cushioned by the control fluid that is isolated in the positive volume, with the result that with an increased mass flow rate of the damping fluid through the disk valve, the degree of opening of the disk valve is increased. As an alternative, a positive throttle is provided instead of the positive slide. Analogous to the open and closed slider positions the flow cross-section of the positive throttle can be reduced and enlarged.

The pressure application device also preferably has a negative slider linkage and a negative slider, having open and closed slider positions, which is arranged at the negative side for applying pressure to the control piston such that, by actuating the negative slider linkage, while separating the negative side from the control fluid reservoir, a negative volume can be isolated at the negative side with the negative slider. Thus, similarly to the control fluid enclosed in the positive volume, the control fluid enclosed in the negative volume causes elastic cushioning of the control piston. If, for example, the positive volume is isolated and the negative volume is not isolated, the elastic cushioning of the control piston is determined by the control fluid in the positive volume. Similarly, the elastic cushioning of the control piston is determined by the control fluid enclosed in the negative volume if the positive volume is not isolated. Thus, with suitable isolation of the positive volume and/or of the negative volume, the elastic cushioning of the control piston can advantageously be defined. As an alternative, a negative throttle is provided instead of the positive slide. Analogous to the open and closed slider positions the flow cross-section of the negative throttle can be reduced and enlarged.

The pressure application device preferably has a volume adjustment device for the positive volume and/or the negative volume with which the volume of the positive volume or of the negative volume can be adjusted. In this way, the stiffness of the elastic cushioning of the control piston can be advantageously adjusted with the volume adjustment device. Furthermore, the pressure application device has a positive slider piston with which the positive volume is delimited and which constitutes the positive slider, wherein if the positive slider linkage is actuated, the positive volume in the collapsing damping strut can be lessened. Thus, with increasing collapsing distance, the positive slider piston has the effect of increasing the damping force which becomes disproportionately greater as the damping strut becomes severely collapsed.

The shock absorber preferably has a damping cylinder and, displaceably arranged therein, a damping piston which delimits the damping volume in the damping cylinder, and on displacement of the shock absorber with the damping cylinder, the positive slider linkage and/or the negative slider linkage are actuated. Alternatively or additionally, the shock absorber has a damping piston rod with which the damping piston is displaceable from outside the damping cylinder and, on displacement of the shock absorber with the damping piston rod, the positive slider linkage and/or the negative slider linkage are actuated.

The shock absorber also preferably comprises an equalization chamber linked to the damping cylinder in damping fluid-conducting manner and for volume equalization of the temporally variable displacement of the damping fluid by means of the damping piston rod on displacement of the damping strut, wherein on displacement of the shock absorber, the positive slider linkage and/or the negative slider linkage are driven due to the flow resistance generated at a constriction by the displaced damping fluid. Furthermore, alternatively or additionally, the shock absorber preferably comprises a separating element which is displaceably arranged in the equalization chamber and with which the equalization chamber is delimited, wherein the volume equalization can be brought about by the displacement of the separating element, wherein on displacement of the shock absorber, the positive slider linkage and/or the negative slider linkage are driven with the separating element. By this means, the positive slider linkage and/or the negative slider linkage are driven dependent on the displacement of the damping strut, the degree of displacement and the displacement speed of the suspension strut determining the driving of the positive slider linkage and/or the negative slider linkage accordingly.

Preferably, the disk valve is arranged in the inflow for the damping fluid to the equalization chamber. It is also preferred that the disk valve is arranged at the damping piston in series with a damping aperture of the damping piston. The predetermined displacement state is preferably a pre-determined stroke value of the shock absorber and the positive linkage and/or the negative linkage are preferably configured to bring about a change in the slider position on detection of the stroke value. It is also preferred that the pre-determined displacement state is a direction change during displacement of the shock absorber and the positive linkage and/or the negative linkage are preferably configured to bring about a change in the slider position on occurrence of the direction change.

BRIEF DESCRIPTION OF THE DRAWINGS

Preferred embodiments of the inventive damping strut will now be described by reference to the accompanying schematic drawings, in which.

DETAILED DESCRIPTION OF PREFERRED EMBODIMENTS

Figure 1:
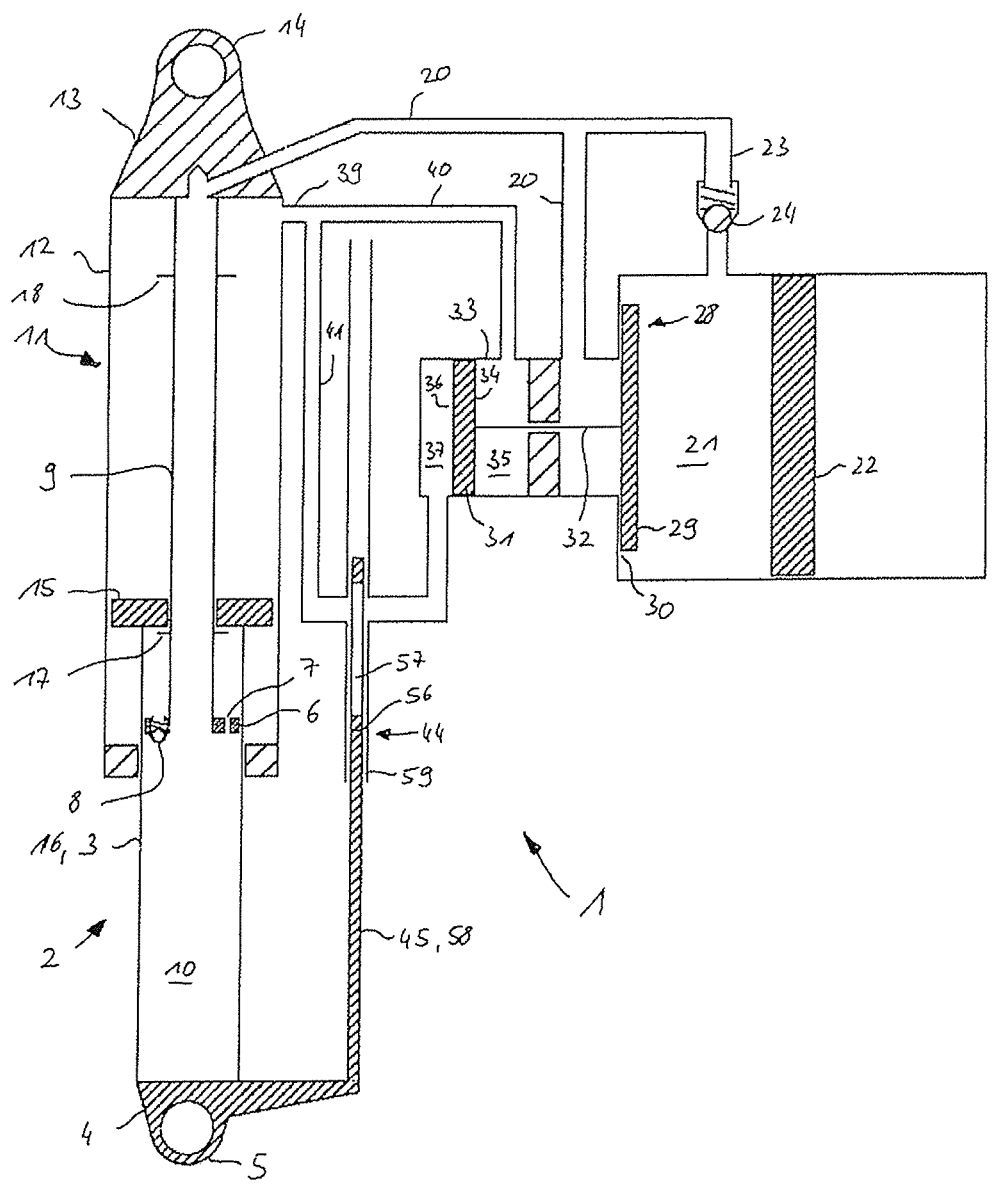
FIGS. 1 and 2 show schematic representations of embodiments of the inventive damping strut, for a compression stage in each case.

As can be seen from FIGS. 1 to 17, a damping strut 1 comprises a shock absorber 2.

The shock absorber 2 can be directly coupled and, during extension is tensile-loaded and, during collapse is compression-loaded. The damping caused by the shock absorber 2 during extension is designated a rebound stage and the damping caused during contraction is designated a compression stage. The shock absorber 2 has a damping cylinder 3 which is configured at one longitudinal end as a damping cylinder head 4 at which a wheel eye 5 is provided. The damping strut 1 is provided for a bicycle so that the front or rear wheel of the bicycle is attached to the wheel eye 5.

A damping piston 6 is provided longitudinally displaceable in the damping cylinder 3, wherein provided in the damping piston 6 is a passage 7 configured as a through hole and, connected in parallel with the passage 7, a rebound stage valve 8. The rebound stage valve 8 is formed by a sphere pre-tensioned by a helical spring, both of which are provided in a further through hole in the damping piston 6, wherein said through hole has a larger diameter than the passage 7. The damping piston 6 is mounted on a damping piston rod 9 which extends in the damping cylinder 3 facing away from the damping cylinder head 4. The damping volume 10 enclosed by the damping cylinder 3 and the damping piston 6 is filled with an incompressible damping fluid, particularly oil. The damping piston 6 is longitudinally displaceable in the damping cylinder 3 by actuating the damping piston rod 9, so that the size of the damping volume 10 is determined by the respective position of the damping piston 6.

The sphere and the helical spring of the rebound stage valve 8 are arranged such that the sphere is pre-tensioned by the helical spring in the direction toward the cylinder head 4.

If the damping piston 6 is moved in the direction toward the cylinder head, the damping volume 10 is reduced and the damping fluid presses the rebound stage valve 8 into the open position thereof so that excess damping fluid can flow out through the rebound stage valve 8. Excess damping fluid also flows through the passage 7, although the mass flow rate of damping fluid through the passage 7 is smaller than through the rebound stage valve 8, since the flow cross-section of the rebound stage valve 8 is greater than that of the passage 7. When the damping fluid flows through the rebound stage valve 8, only small flow losses are incurred, so that the counteracting damping force generated by the flow losses during collapsing of the damping piston 6 is small. In contrast thereto, on displacement of the damping piston 6 away from the cylinder head 4, the rebound stage valve 8 is in the closed position, so that the excess damping fluid passes only through the passage 7. This is associated with large flow losses in the damping fluid flow, so that the damping force counteracting the damping piston 6 is high.

Furthermore, the damping strut 1 has a gas pressure spring 11 which consists of a gas pressure spring cylinder 12 with a gas pressure cylinder head 13. A frame eye 14 with which the damping strut can be fastened to the frame of the bicycle is provided at the gas pressure cylinder 13. The suspension of the wheel on the frame of the bicycle is therefore achieved with the damping strut 1. A gas pressure spring piston 15 is arranged longitudinally displaceable in the gas pressure spring cylinder 12, wherein a gas pressure spring volume which is filled with a spring gas is enclosed by the gas pressure spring piston 15 and the gas pressure spring cylinder 12. The gas pressure spring 11 exhibits spring behavior due to the compressibility of the spring gas.

Arranged at the longitudinal end of the damping cylinder 3 facing away from the damping cylinder head 4 is the gas pressure spring piston 15, wherein the damping piston rod 9 extends through the gas pressure spring cylinder 12 and is fastened with the longitudinal end facing away from the damping piston 6 at the gas pressure spring cylinder head 13, so that the shock absorber 2 and the gas pressure spring 11 are displaceable telescopically into one another. A first gas pressure spring piston stop 17 and a second gas pressure spring piston stop 18 are provided at the damping piston rod 9, the separation of the gas pressure spring piston stops 17, 18 defining the maximum displacement travel of the gas pressure spring piston 15. If the gas pressure spring piston 15 lies against the first gas pressure spring piston stop 17, the suspension strut 1 is in the extended position and if the gas pressure spring piston 15 lies against the second gas pressure spring piston stop 18, the damping strut 1 is in the collapsed position. If, for example, during travel with the bicycle over uneven ground, the damping strut 1 is collapsed by a heavy impact, the danger exists that the gas pressure spring piston 15 hits the second gas pressure spring piston stop 18, thus severely impairing the ride comfort and risking damage to the damping strut 1.

A first compression stage of the damping strut 1 is shown in FIG. 1. Since the damping piston rod 9 extends into the damping cylinder 3, a displacement effect is produced by the damping piston rod 9, depending on the position of the damping piston 6. For this purpose, the shock absorber 2 has a compensation line 20 with which the damper volume 10 is connected in damping fluid-conducting manner to a compensation chamber 21. The damping piston rod 9 is constructed hollow, and the compensation line 20 in the gas pressure spring cylinder head 13 opens into the interior of the damping piston rod 9. When the damping cylinder 6 moves into the damping cylinder 3, damping fluid is increasingly displaced by the damping piston rod 9 and the excess fluid is fed via the damping piston rod 9 and the compensation line 20 into the compensation chamber 21.

The compensation chamber 21 has a displaceable separating element 22, the position of which determines the volume of the compensation chamber 21 such that the excess damping fluid is stored in the compensation chamber 21. If the damping strut 1 is in the [collapsed position], the separating element 22 is arranged in one extreme position by which the maximum volume of the compensation chamber 21 is defined. If, however, the damping strut 1 is in the extended position, the separating element 22 is arranged in the other extreme position by which the minimum volume of the compensation chamber 21 is defined.

For the outflow of the damping fluid out of the compensation chamber 21, a return line 23 is provided which opens from the compensation chamber 21 into the compensation line 20. A return valve 24 which opens only in the return flow direction from the compensation chamber 21 to the damping volume 10 is provided in the return line 23. Arranged at the entry of the compensation line 20 to the compensation chamber 21 is a disk valve 28, the disk 29 of which is arranged in the compensation [chamber] 21 such that the disk valve seat 30 of the disk 29 defines an entry cross-section for the damping fluid flow into the compensation chamber 21. When the damping fluid flows through the entry cross-section of the disk valve 28 at the disk valve seat 30, flow losses occur according to the position of the disk 29 and the entry aperture degree resulting therefrom. If a small flow cross-section is pre-determined at the valve seat 30, the flow losses are high, whereas given a large flow cross-section at the disk valve 28, the flow losses are small or even zero. A control piston 31 is linked to the disk 29 via a control piston rod 32, wherein the control piston 31 is displaceably arranged in a control piston cylinder 33. The control piston 31 has a positive side 34 at a side facing the disk 29 and a negative side 36 facing away from the disk 29. A positive volume 35 is defined by the control piston cylinder 33 and the positive side 34, and a negative volume 37 is defined by the negative side 36 and the control piston cylinder 33.

The control piston cylinder 33 is connected in gas-conducting manner via a pressure application line 39 to the interior of the gas pressure spring cylinder 12, wherein, from the pressure application line 39, a positive line 40 branches to the positive volume 35 and a negative line 41 branches to the negative volume 37. The positive volume 35 and the negative volume 37 are connected to one another in gas-conducting manner by means of the pressure application line 39, the positive line 40 and the negative line 41, so that there is no pressure difference at the control piston 31 between the positive side 34 and the negative side 36. The control piston 31 is also movable in the control piston cylinder 33 without generating pressure differences since pressure equalization always takes place between the positive side 34 and the negative side 36 via the pressure application line 39, the positive line 40 and the negative line 41. The disk 29 of the disk valve 28 is therefore movable in the compensation chamber 21 practically resistance-free, so that the degree of opening of the disk valve 28 at the disk valve seat 30 is determined by the conditions of flow of the damping fluid out of the compensation line 20 into the compensation chamber 21.

Furthermore, the damping strut 1 comprises a negative slider 44 which is directly coupled to the damping cylinder head 4 by means of a negative slider linkage 45 which is configured with a push rod 58. The negative slider 44 has a slider plate 56 in which a slider aperture 57 is introduced, wherein the slider plate 56 is longitudinally guided in a guide 59. The negative slider 44 is built into the negative line 41 in such a way that, on undershooting a pre-determined stroke of the damping strut 1, the slider aperture 57 is arranged in the flow of the negative line 41, whereas on exceeding the pre-determined stroke of the damping strut 1, the slider aperture 57 is moved out of the flow region of the negative line 41, so that the flow of the negative line 51 is blocked by the slider plate 56. The negative slider 44 is thus brought into the locking state thereof so that the negative volume 37 is isolated from the pressure application line 39.

In the extended position of the damping strut 1, the negative slider 44 is in the open position so that the control piston 31 can move the disk 29 without any pressure difference. If, during collapsing of the damping strut 1, the pre-determined stroke is reached, the negative slider 44 is in the closed position and remains closed in each position of the damping strut 1 lying between the pre-determined stroke and the collapsed position. In this case, depending on the respective stroke of the gas pressure spring, a pressure difference exists at the control piston which leads to a closing force of the disk valve 28. The more the damping strut 1 is collapsed, the greater is the pressure difference at the control piston 31 and the greater is the closing force of the disk valve 28 transmitted by the control piston 31 to the disk valve 28. The greater the closing force of the disk valve 28, the smaller is the degree of opening at the disk valve seat 30, so that the flow losses at the disk valve seat 30 are greatest in the collapsed position of the damping strut 1.

During collapsing of the damping strut 1 from the extended position to the pre-determined stroke, the damping force is constant and then increases from the pre-determined stroke to the collapsed position. This has the result that the damping strut 1 has a damping characteristic such that when the bicycle is ridden over uneven ground, the maximum stroke of the damping strut 1 is utilized effectively and bottoming of the damping strut 1 is prevented. In situations where the damping strut 1 is displaced from the extended position to the pre-determined stroke, the damping force is determined by the flow conditions at the passage 7 of the damping piston 6 and, if the collapsing speed is low, the damping force is small and if the collapsing speed is high, the damping force is large. Once the pre-determined stroke is reached, under the control of the control piston 31, the disk valve 28 generates an additional damping force at the disk valve seat 30 in the excess damping fluid flowing out of the damping volume 10.

Figure 2:
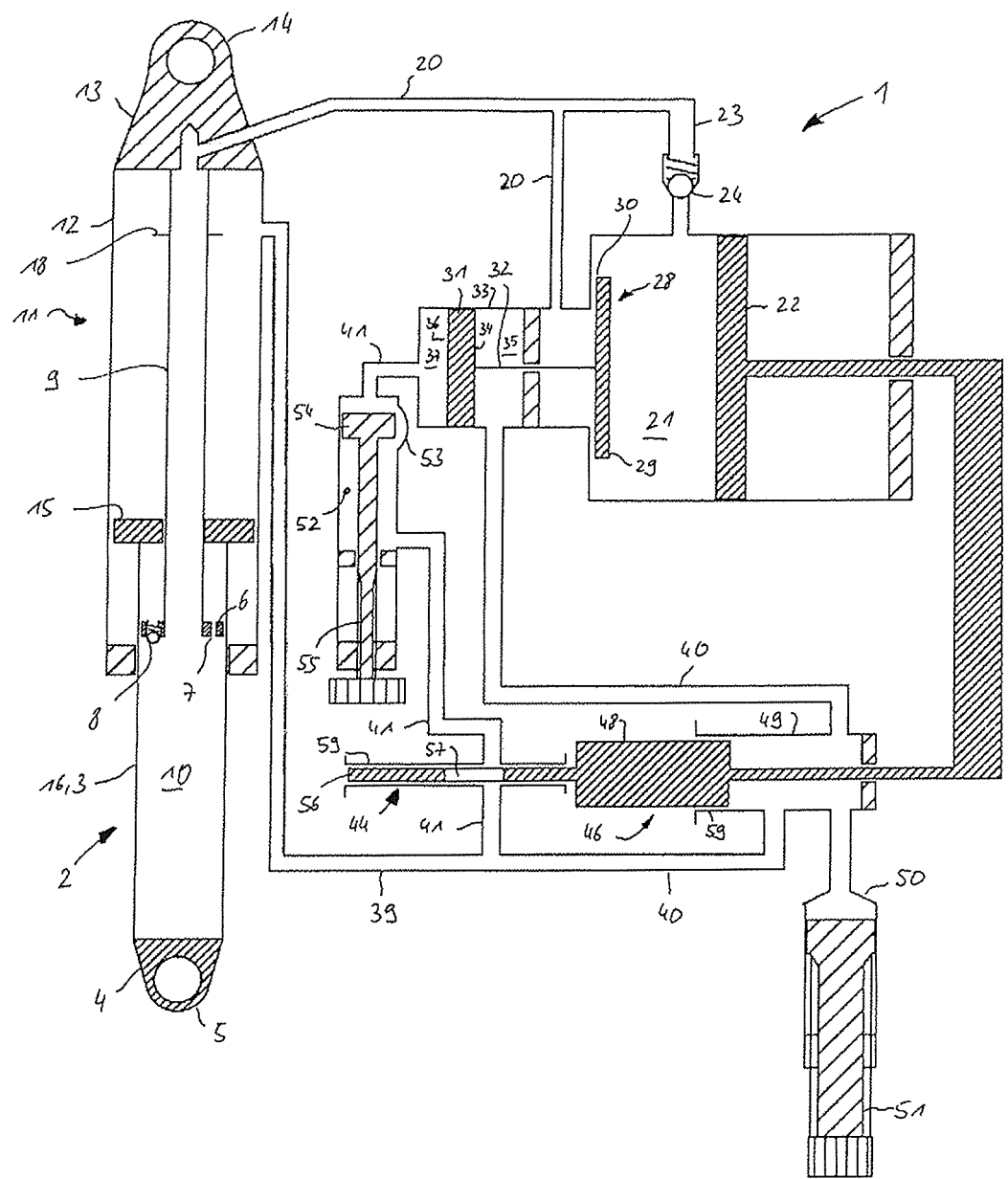

FIG. 2 shows a second compression stage of the damping strut 1. In contrast to the first compression stage of FIG. 1, the second compression stage has the negative slider linkage 45 as the push rod 58 which is coupled to the separating element 22. Furthermore, the damping strut 1 has a positive slider 46 which is arranged in the positive line 40. The positive slider 46 is driven with a positive slider linkage 47, formed by the negative slider linkage 45. The positive slider 46 also comprises a positive slider piston 48 which is displaceably arranged in a positive slider cylinder 49. The positive slider 46 is configured such that the positive slider piston 48 is incorporated into the positive slider cylinder 49 and in the positive line 40 such that on reaching a second pre-determined stroke which is greater than the first pre-determined stroke, the positive slider 46 is brought from the open position into the closed position, so that the positive volume 35 is isolated from the pressure application line 39. If the damping strut 1 is brought from the second pre-determined stroke to the collapsed position, the positive slider piston 48 is moved further into the positive slider cylinder 49, so that the positive volume 35 is reduced and the pressure is increased at the positive side 34 of the control piston 31. The positive slider piston 48 and the separating element 22 are configured in the cross-sectional areas thereof such that the pressure rise in the positive volume 35 has a greater gradient compared with the first compression stage of FIG. 1. The positive slider piston 48 of the positive slider 46 therefore acts in a reinforcing manner on the damping force of the damping strut generated by the disk valve 28 when suitably large strokes of the damping strut 1 are reached.

Connected to the positive volume 35 is a positive variation volume 50, the size of which is adjustable with a positive adjustment screw 51. Therefore, with the aid of the positive adjustment screw 51, the size of the positive volume 35 can be adjusted. If the positive slider 46 is in the closed position, the size of the positive volume 35 has an influence on the reinforcement effect of the positive slider piston 48; specifically, the greater the positive volume 35, the flatter the gradient of the reinforcement effect of the positive slider piston 48 on the damping force generated by the disk valve 28.

Provided in the negative line 41 is a negative variation volume 52 in which a negative piston 54 is arranged with a bypass 53. The negative piston 54 is displaceable by a negative variation screw 55 such that in the position of the negative piston 54 in which the negative volume is minimal, the bypass 53 is in the passable state, so that the negative volume 37 is connected in gas-conducting manner to the pressure application line 39. If the negative variation screw 55 is adjusted, the negative piston 54 closes the bypass 53 so that the negative volume 37 is isolated from the pressure application line 39, so that given a corresponding position of the negative piston 54, the negative variation volume 52 can be defined.

If the bypass 53 is closed by the negative piston 54, then according to the size of the negative variation volume 52, a corresponding pressure exists on the negative side 36 of the control piston 31. Since the negative variation screw 55 is arranged such that, on actuation of the negative variation screw 55, the negative volume 52 can only be increased, a pressure difference always forms at the control piston 31 which acts on the disk valve 28 in the closing direction thereof. It is thus possible that by actuating the negative variation screw 55, the disk valve 28 is pre-tensioned, so that an additional damping force which is independent of the stroke of the damping strut 1 is generated with the disk valve 28. Particularly advantageous is the coupling of the negative slider linkage 45 and/or of the positive slider linkage 47 by means of the separating element 22 for the damping strut 1 with different maximum stroke configurations, since by adjusting the ratio of the effective area of the separating element 22 to the cross-sectional area of the piston rod 9, particularly with a size adjustment of the effective area of the separating element 22 to the cross-section of the piston rod 9, a similar stroke behavior of the separating element 22 can be adjusted, so that the linkages 45, 47 coupled via the separating element 22 and thus also the components 44, 46, 48, 49, 50, 51 and 52 can be executed identically for all damping strut lengths.

Figure 3:
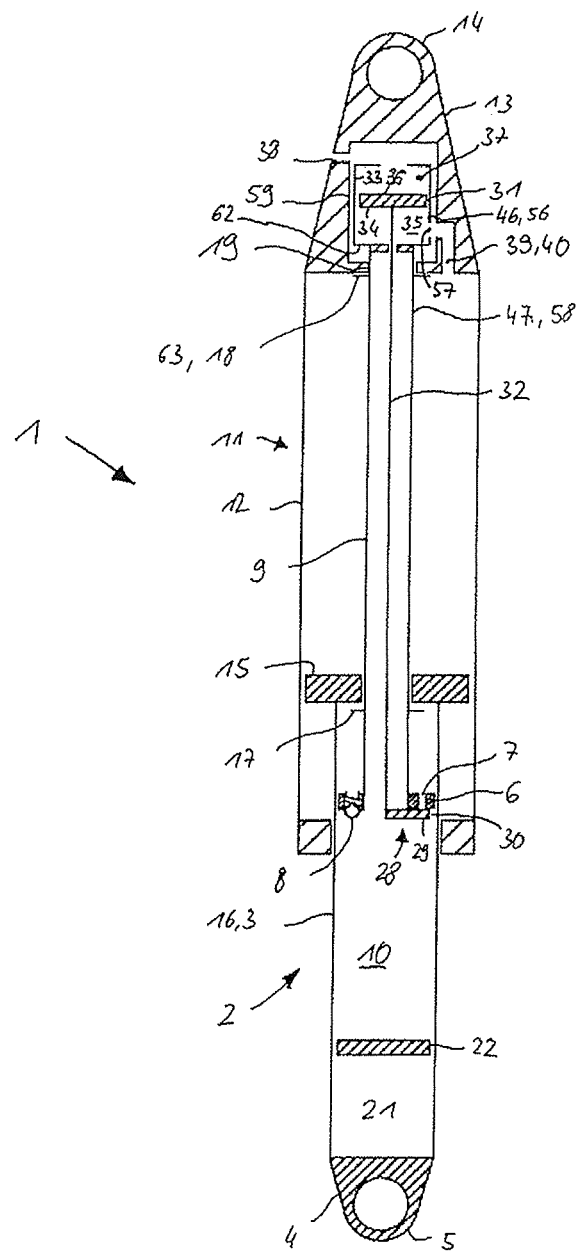
FIGS. 3 to 8 show schematic representations of embodiments of the inventive damping strut, for a rebound stage in each case.

FIG. 3 shows a first rebound stage of the damping strut 1. According to the first rebound stage, the disk valve 28 is arranged on the damping piston 6, the passage 7 being closable by the disk 29. The disk valve seat 30 is arranged facing the passage 7 so that the degree of opening of the disk valve 28 is adjusted at the disk valve seat 30. The control piston rod 32 extends through the damping piston rod 9 and is arranged longitudinally displaceable therein. Arranged in the gas pressure spring cylinder head 13 is the control piston cylinder 33 in which the control piston 31 is mounted longitudinally displaceable. The gas pressure spring cylinder head 13 has an atmospheric aperture by which the negative volume 37 is connected to the atmosphere, so that the negative side 36 of the control piston 31 is impinged upon by the atmosphere. Also provided in the gas pressure spring cylinder head 13 is the pressure application line 39 with which the positive side 34 of the control piston 31 is connected to the interior of the gas pressure spring cylinder 12 in gas-conducting manner.

The gas pressure spring cylinder head 13 also comprises a gas pressure spring piston rod bearing 19 in which the damping piston rod 9 is longitudinally displaceably mounted. The longitudinal displacement of the damping piston rod 9 is limited by two stops 62, 63 which are fastened to, and project from, the damping piston rod 9, and in the intermediate space between which the gas pressure spring piston rod bearing 19 engages. The first stop 62 is formed by the second gas pressure spring piston stop 18 so that the longitudinal displacement of the damping piston rod 9 is limited in the direction out of the damping cylinder 3, whereas the movement of the damping piston rod 9 in the damping cylinder 3 is limited by the second stop 63. The positive slider 46 is mounted on the damping piston rod 9, the slider plate 56 and the slider aperture 57 thereof being arranged such that if the damping piston rod 9 lies with the second stop 63 thereof against the gas pressure spring piston rod bearing 19, the positive side 35 is connected via the pressure application line 39 to the interior of the gas pressure spring cylinder 12 in gas-conducting manner and, if the damping piston rod 9 lies with the first stop 62 thereof against the gas pressure spring piston rod bearing 19, the positive slider 46 blocks the pressure application line 39.

When the damping strut 1 is displaced, a hydrodynamic resistance caused by the damping fluid acts on the damping piston 6, so that on collapsing of the damping strut 1, the second stop 63 lies against the gas pressure spring piston rod bearing 19 and on extension of the damping strut 1, the first stop [62] lies against the gas pressure spring piston rod bearing 19. Therefore, during collapsing of the damping strut 1, the positive slider 46 is in the open position, whereas on extension of the damping strut 1, the positive slider 46 is in the closed position. If, for example, the damping strut 1 is first collapsed, the pressure in the positive volume 35 increases continuously so that the pre-tension of the disk valve 28 likewise continuously increases. If, then, the damping strut 1 is extended, the positive slider 46 is brought into the closed position thereof, so that the pressure in the positive volume 35 and thus the pre-tension of the disk valve 28 remains constant. On subsequent further collapsing of the damping strut 1, the positive slider 46 is brought back into the open position, so that pressure equalization can take place between the positive volume 35 and the interior of the gas pressure spring cylinder 12. Therefore, during collapsing maneuvers, the pressure in the positive volume 35 increases accumulatively and, during a subsequent extension maneuver, the pressure accumulated in the positive volume 35, and thus the resultant closing force applied via the control piston rod 32 to the disk valve 28, is kept constant and only on resumption of the collapsing maneuver is the pressure in the positive volume 35 adjusted, initiated by the stroke reversal, to the current stroke of the damping strut 1 by means of the pressure equalization with the interior of the gas pressure spring cylinder 12. By the provision of the stops 62, 63 and the gas pressure spring piston rod bearing 19, the damping piston rod 9 is mounted floating so that during a direction change, on displacement of the damping strut 1 from collapsing to extending, the positive slider 46 is suddenly closed and, when changing from extending to collapsing, suddenly opened.

Figure 4:
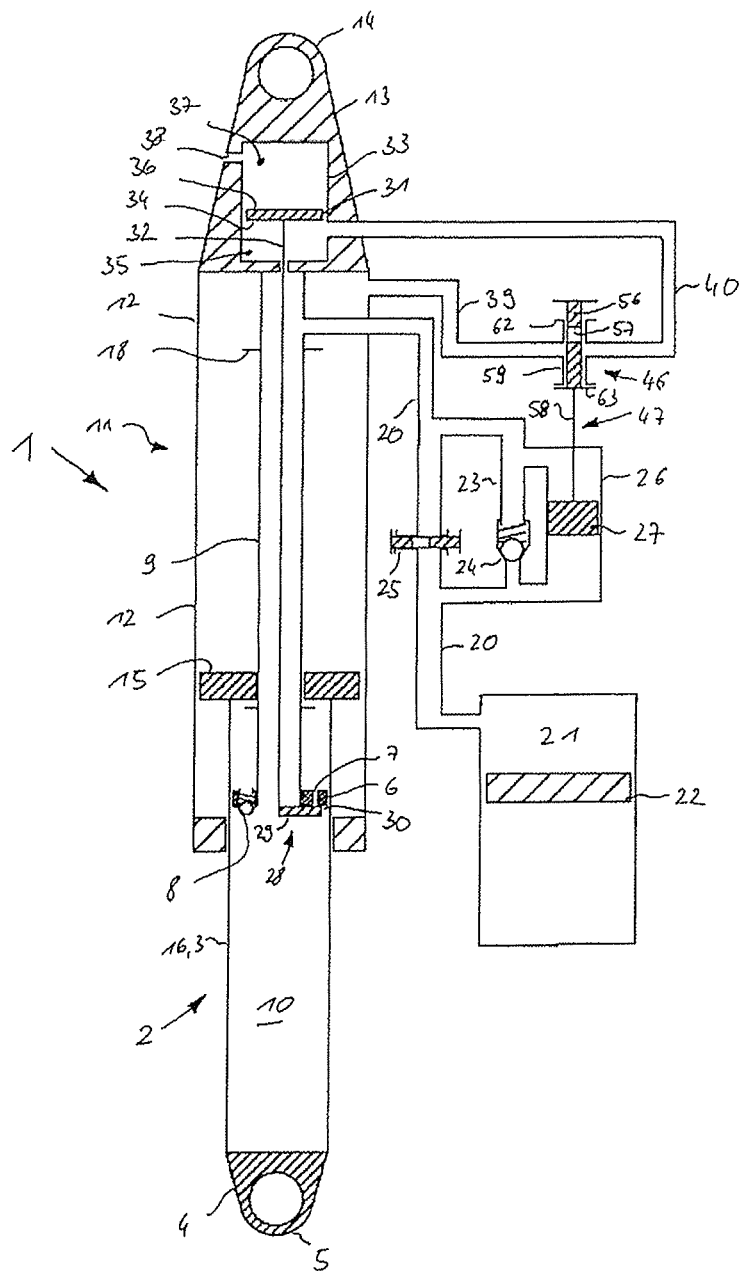

A second rebound stage of the damping strut 1 is shown in FIG. 4. Contrary to the first rebound stage of FIG. 3, in the second rebound stage, the damping piston rod 9 is firmly connected to the gas pressure spring cylinder 12. Furthermore, the positive slider 46 is provided in the pressure application line 39 and is actuated by a sensor piston 27 via the positive slider linkage 47. The sensor piston 27 is arranged longitudinally displaceable in a sensor line 26, the sensor line 26 bypassing a restrictor 25 which ensures, in particular, the compression stage damping of the gas pressure spring 11 and is built into the equalization line 20. The pressure difference that arises from the flow through the restrictor 25 is applied to the sensor piston 27 so that the positive slider 46 is switched according to this pressure difference. The sensor piston 27 and the positive slider 46 are configured such that when the damping strut 1 collapses, the positive slider 46 is brought into the open position and, on extension of the damping strut 1, is brought into the closed position.

The return valve 24 is built into the return line 23 which is connected in parallel with both the restrictor 25 and the sensor piston 27. The return valve 24 is in the closed position on collapsing of the damping strut 1 and on extension of the damping strut 1, as soon as the pre-tension of the return valve 24 is overcome, in the open position. Both the restrictor 25 and the return valve 24 bypassing said restrictor 25 generate a sufficient hydrodynamic pressure in the sensor line 26 such that, during collapsing of the damping strut 1, the sensor piston 27 opens the positive slider 46 via the positive slider linkage 47 and, during extension of the damping strut 1, closes the positive slider.

Figure 5:
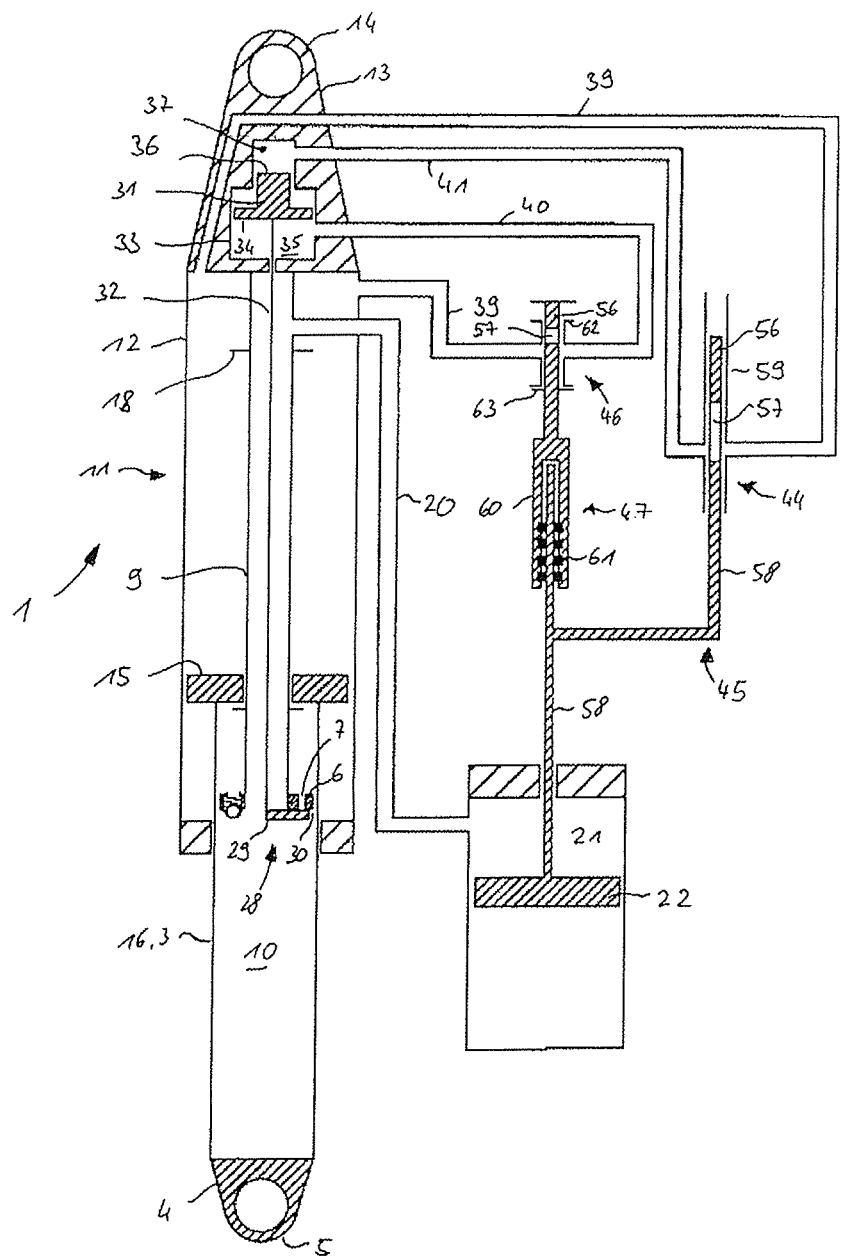

A third rebound stage of the damping strut 1 is shown in FIG. 5. In contrast to the second rebound stage of FIG. 4, the third rebound stage has a slip clutch 60 as the positive slider linkage 47, comprising a plurality of O-rings 61 arranged behind one another, into which the push rod 58 engages longitudinally displaceably. The push rod 58 is linked to the separating element 22 so that on a change of direction, when the damping strut 1 is displaced, by means of the slip clutch 60, a sudden change in the position of the positive slider 46 can be achieved, specifically on a change from collapsed to extended, from the closed position into the open position and, on a change from extended to collapsed, from the open position into the closed position. Furthermore, the negative slider 44 is provided in the pressure application line 39, the negative slider linkage 45 being driven, via the push rod 58, by the separating element 22. The slider aperture 57 in the slider plate 56 is dimensioned and arranged in the guide 59 in relation to the pressure application line 39 such that only after reaching the pre-determined stroke is the negative slider 44 in the closed position thereof, and is in the open position before reaching this stroke.

It is also preferred that a bypass pusher (not shown) acting in parallel with the positive slider 46 is linked via the push rod 58, said bypass pusher opening a bypass channel (not shown) which bypasses the positive slider 46 before reaching the pre-determined stroke of the damping strut 1 and therefore renders the positive slider 46 inactive before reaching the pre-determined stroke. This has the result that, before reaching the pre-determined stroke, the gas pressure of both the positive volume 35 and of the negative volume 37 is equal and thus also the pre-tension of the disk valve 28 actuated by the control piston 31 and the control piston rod 32 is constant and thus also the rebound stage damping of the damping strut 1 is stroke-independent before the pre-determined stroke is reached. Only when the pre-determined stroke is reached or exceeded during collapsing do both the negative slider 44 and the bypass slider close. The positive slider 46 is held open by means of the slip clutch 60, so that the pressure in the positive volume 35 rises, but remains constant in the negative volume 37. Due to the stroke reversal from collapse to extension of the damping strut 1, the positive slider 46 is closed via the slip clutch 60 and thus the pressure prevailing in the gas pressure spring 11 during the stroke reversal is stored in the positive volume 35 so that, during the extension, a constant high pre-tension force is applied by the control piston 31 to the disk valve 28 and thus the rebound stage damping is determined depending on the maximum collapse stroke reached by the damping strut 1 until the positive volume 35 is connected to the gas pressure spring cylinder 12 of the gas pressure spring 11 for pressure equalization, either through a renewed stroke reversal of the damping strut 1, by the positive slider 46 via the slip clutch or, on exceeding the pre-determined stroke, via the bypass channel and the bypass slider which is open at these stroke values.

The control piston 31 is configured stepped, the negative side having a smaller surface area than the positive side. By this means it is achieved that, even at the same pressures in the positive volume 35 and the negative volume 37, a force resulting therefrom is exerted by the control piston 31 on the control piston rod 32, so that the disk valve 28 is constantly pre-tensioned. Precisely in this way, with the reverse arrangement (not shown), specifically with the negative side 36 having a larger surface area than the positive side 34 of the control piston 31, it can advantageously be achieved that, given equal pressures in the positive volume 35 and the negative volume 37 of the control piston 31, the control piston 31 exerts a resultant force on the control piston rod 32, which holds the disk valve 28 open until a significant pressure difference forms between the positive volume 35 and the negative volume 37 and the control piston 31 closes and pre-tensions the disk valve 28 against the disk valve seat 30.

Figure 6:
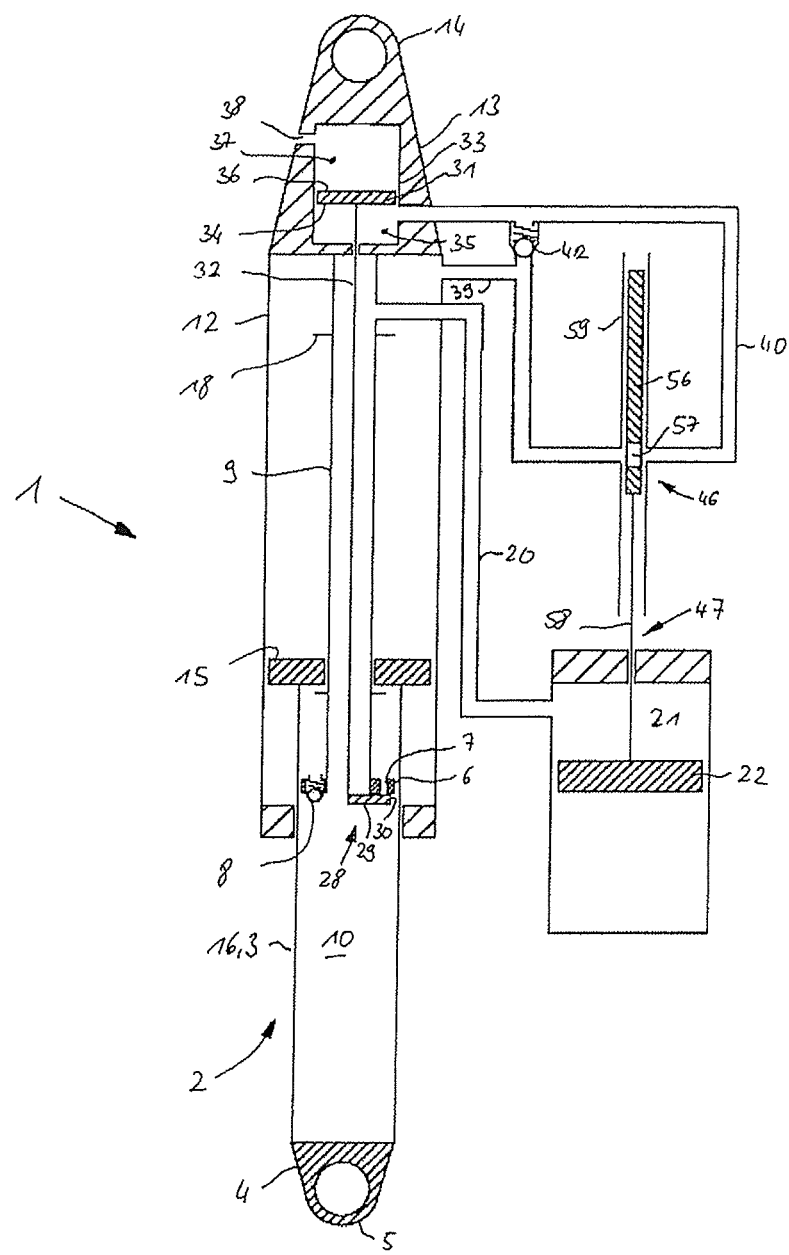

A fourth rebound stage of the damping strut 1 is shown in FIG. 6. According to the fourth rebound stage, the positive slider 46 is controlled by the separating element 22 via the push rod 58, wherein the positive slider 46 is bypassed by a pre-tension valve 42. The pre-tension valve 42 is arranged between the pressure application line 39 and the positive line 40 such that, on extension of the damping strut 1, the pre-tension valve 42 can be brought into the closed position thereof and, on collapsing the damping strut 1, by overcoming the pre-tension, can be brought into the open position. The pre-tension of the pre-tension valve 42 can be overcome if the positive slider 46 is closed after reaching the pre-determined stroke and, on further collapsing of the damping strut 1, the pressure difference between the positive volume 35 and the interior of the gas pressure spring cylinder head 12 exceeds the pre-tension of the pre-tension valve 42. The pre-tension valve 42 is then brought into the open position thereof, so that the positive volume 35 is connected to the interior of the gas pressure spring cylinder 12, although the positive slider 46 is in the closed position thereof. Equalization of the pressure stored in the positive volume 35 via the collapsing of the damping strut 1 can only be achieved if the damping strut 1 has reached the pre-determined extension state and the positive slider 46 has reached the open position.

Figure 7:
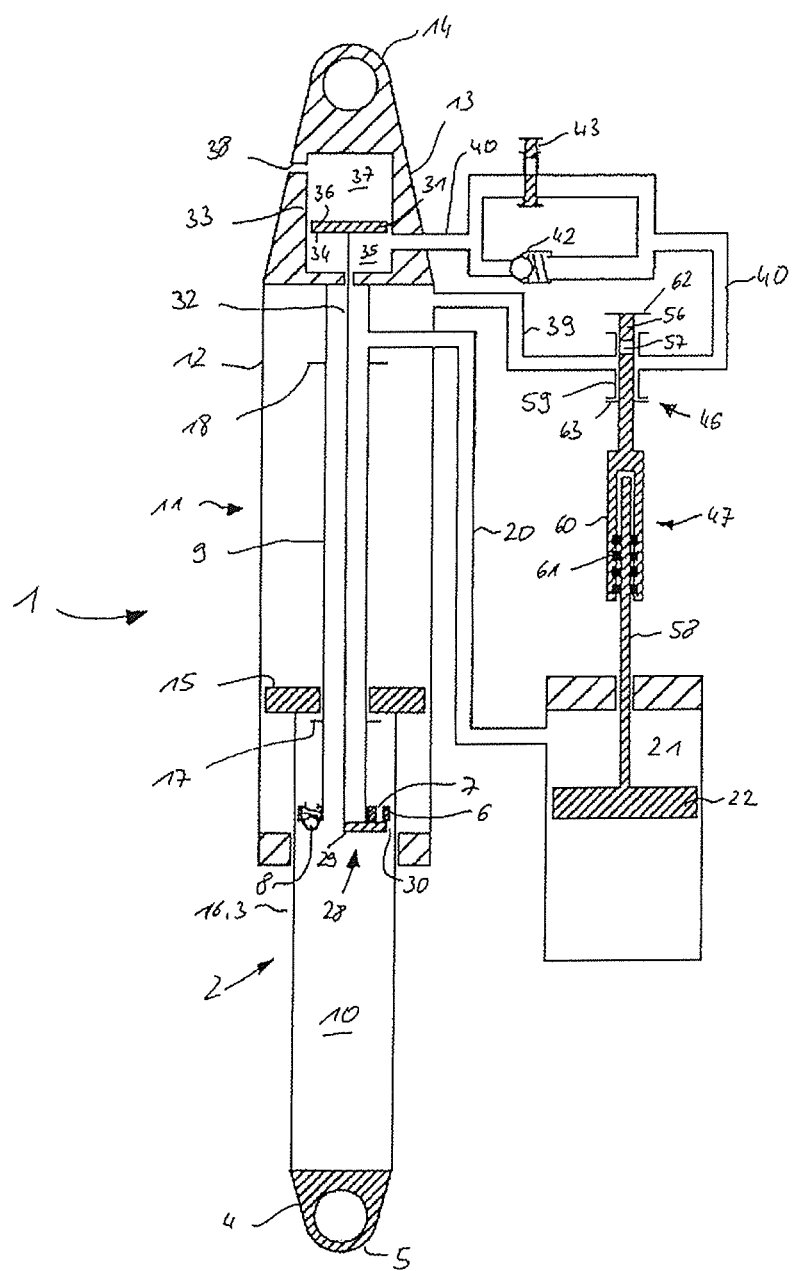

A fifth rebound stage of the damping strut 1 is shown in FIG. 7. In the positive line 40, the positive slider 46 is driven with the slip clutch 60 as the positive slider linkage 47 by the separating element 22 via the push rod 58. An open-closed valve 43 which is bypassed by a pre-tension valve 42 is also built into the positive line 40. If the open-closed valve 43 is brought into the closed position thereof, the connection of the positive volume 35 to the interior of the gas pressure spring cylinder 12 is brought about via the pre-tension valve 42. If, however, the open-closed valve 43 is brought into the open position thereof, the pre-tension valve 42 is rendered ineffective. The open-closed valve 43 is designed able to be actuated from outside, so that the open-closed valve 43 can optionally be brought into the open or the closed position. With this arrangement, it is brought about that, with the open-closed valve 43 closed, as the damping strut 1 collapses, the pressure in the positive volume 35 can no longer rise and, on the next stroke reversal from extension to collapse, a gas pressure remaining in the positive volume 35 from a previous sprung contraction is equalized with the gas pressure prevailing in the gas pressure spring 11 during this stroke reversal via the pre-tension valve 42, and can only rise again on renewed opening of the open-closed valve 43.

Figure 8:
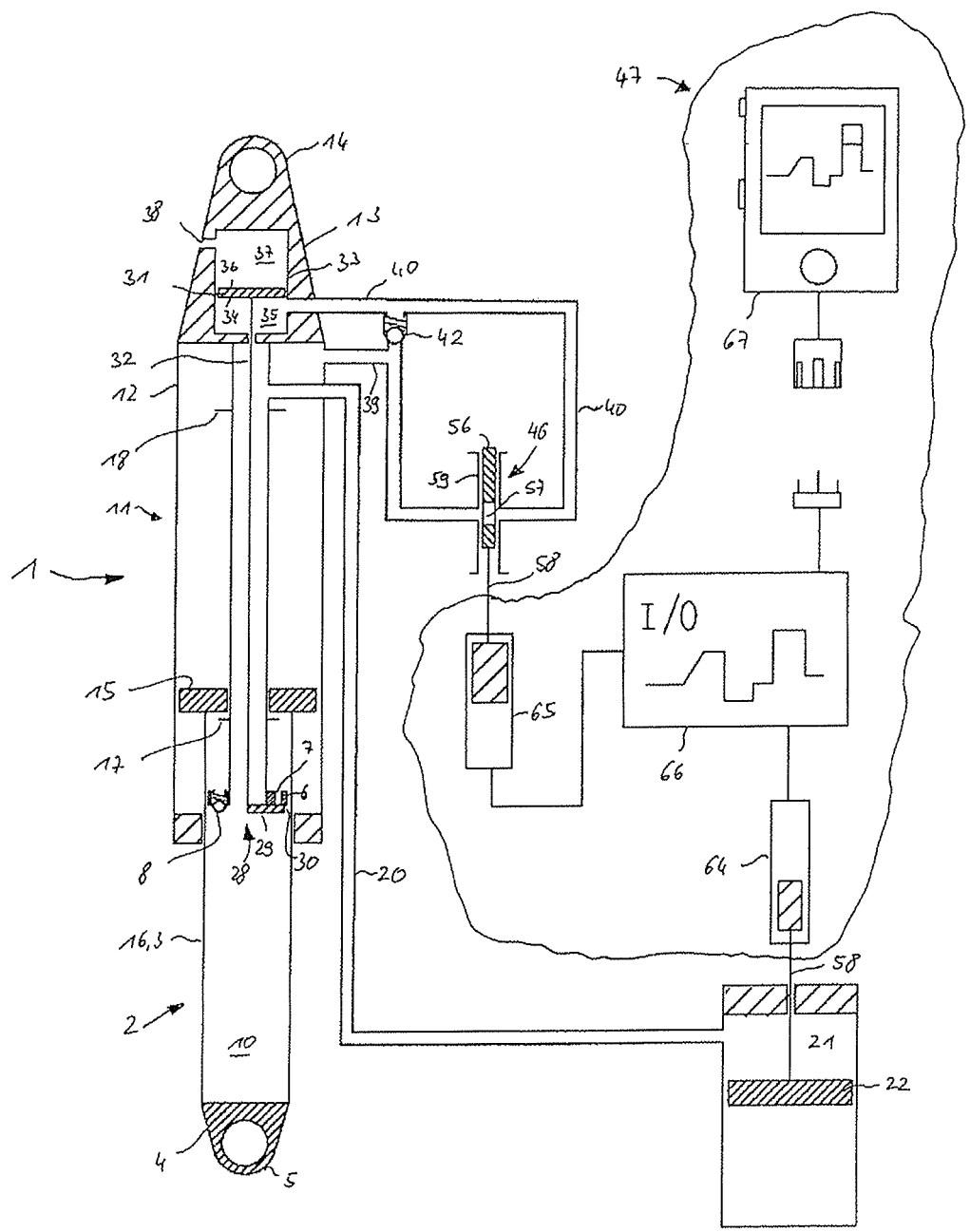

A sixth rebound stage of the damping strut 1 is shown in FIG. 8. The positive slider linkage 47 has a sensor 64 which is coupled via the push rod 58 to the separating element 22. With the sensor 64, the position of the separating element 22 can be detected and, depending thereon, an actuator 65 which drives the push rod 58 for actuating the positive slider 46 can be controlled. The sensor 64 is configured dependent on the position of the separating element 22 to generate data which are input to a converter 66. Depending on these data, the converter 66 generates corresponding control of the actuator 65. Apart from the position of the separating element 22, the converter 66 processes the movement speed, the movement direction and the movement direction change thereof. The correlation between the data input by the sensor 64 to the converter 66 and the control of the actuator 65 is stipulated in the converter 66. This correlation can be changed with a converter manipulation device 67, preferably a Smartphone which allows direct characteristic manipulation of this correlation via a graphic user interface on the screen of the Smartphone, which can be connected, if needed, to the converter 66, in particular for transferring the newly adjusted correlation or for direct manipulation thereof in the converter 66.

FIGS. 10 to 13 show a cross-section through an embodiment of the damping strut 1 with a gas pressure spring 11. FIGS. 14 to 17 show cross-sections of embodiments of the damping strut 6 and of the disk valve 28.

A gas pressure application device is optionally configured as the pressure application line 39, the positive line 40, the negative line 41, the pre-tension valve 42, the open-closed valve 43, the negative slider 44, the negative slider linkage 45, the positive slider 46, the positive slider linkage 47, the positive slider piston 48, the positive slider cylinder 49, the positive variation volume 50, the positive adjustment screw 51, the negative variation volume 52, the bypass 53, the negative piston 54, the negative variation screw 55, the slider plate 56, the slider aperture 57, the push rod 58, the guide 59, the slip clutch 60, the O-ring 61, the first stop 62, the second stop 63, the sensor 64, the actuator 65, the converter 66 and the converter manipulation device 67.

Figure 9:
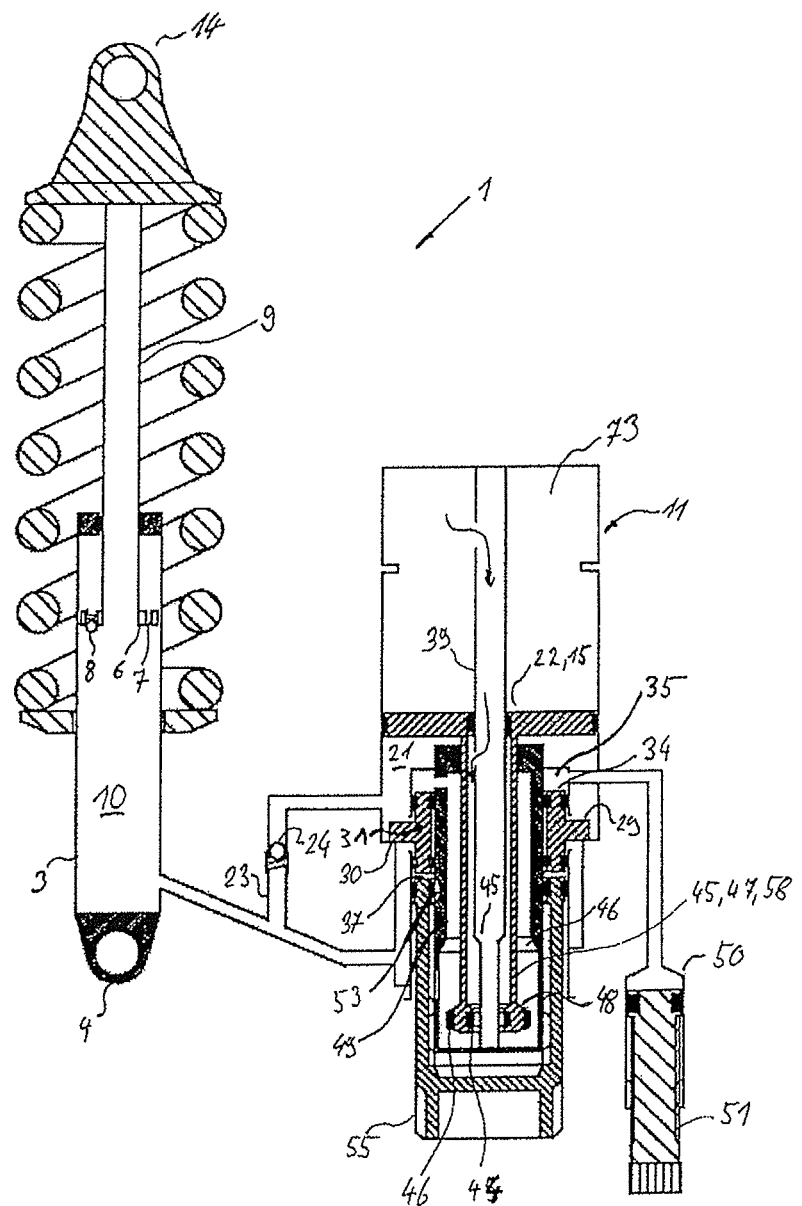
FIG. 9 shows a cross-section through an embodiment of the inventive damping strut with a helical spring.

The damping strut 1 of FIG. 9 corresponds to the scheme of the compression stage of FIG. 2, but rather than the gas pressure spring 11 of FIG. 2, has a helical spring 68. A gas pressure of the pressure chamber 73 acting via the separating element 22 on the compensation chamber 21 and thus via the damping fluid on the piston rod 9—said pressure chamber 73 therefore acting as a supporting gas pressure spring in parallel with the helical spring—is used as the control fluid and acts via the pressure application line 39 and the sliders 44 and 46 on the control piston 31. The individual components, particularly the disk valve 28, the control piston 31, the separating element 22, the positive slider 46 and the negative slider 44, the positive slider piston 48 and the positive slider cylinder 49 are configured cylindrical or annular and are arranged concentrically with one another.

Figure 10:
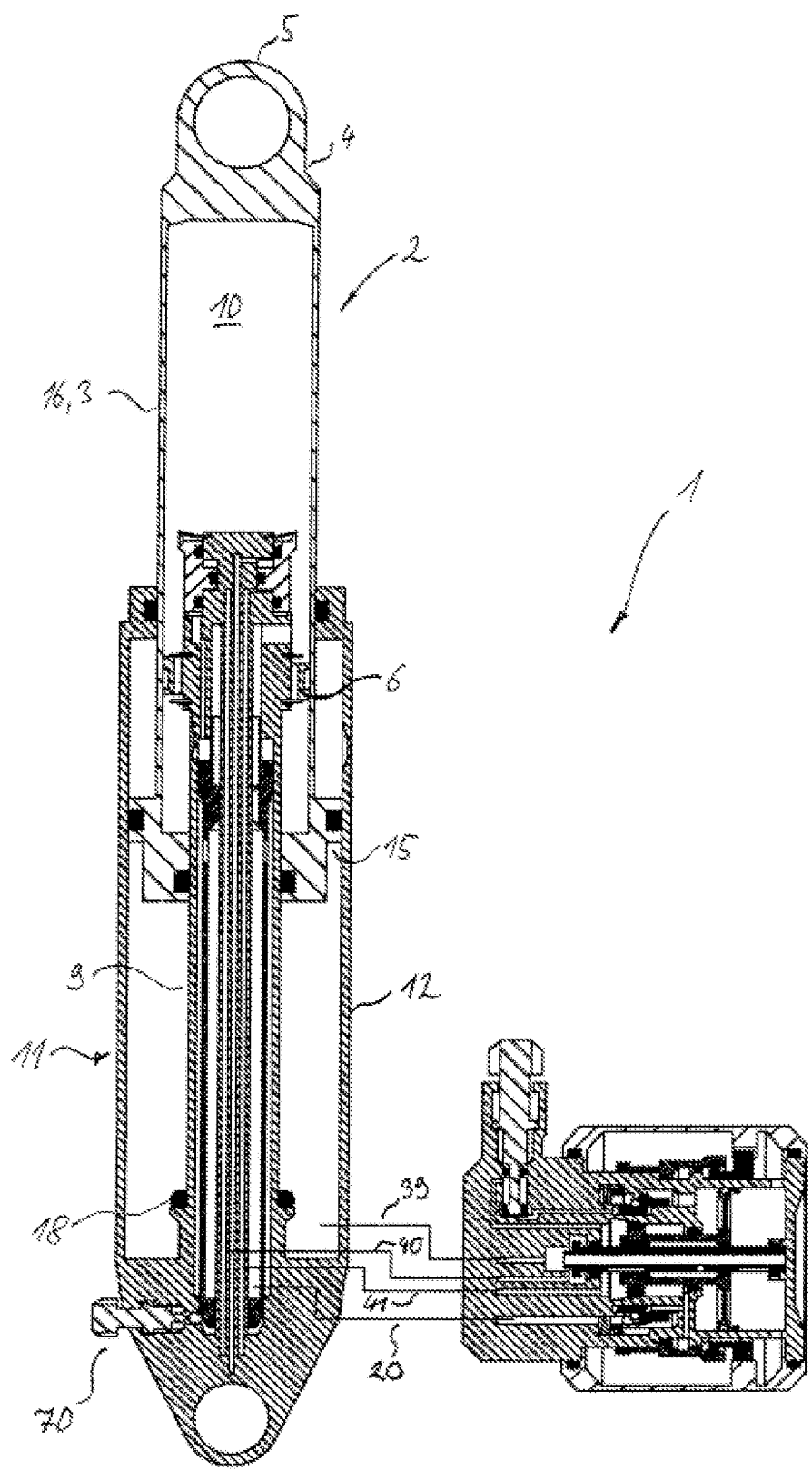
FIG. 10 shows a cross-section through an embodiment of the inventive damping strut with a gas compression spring.
Figure 11:
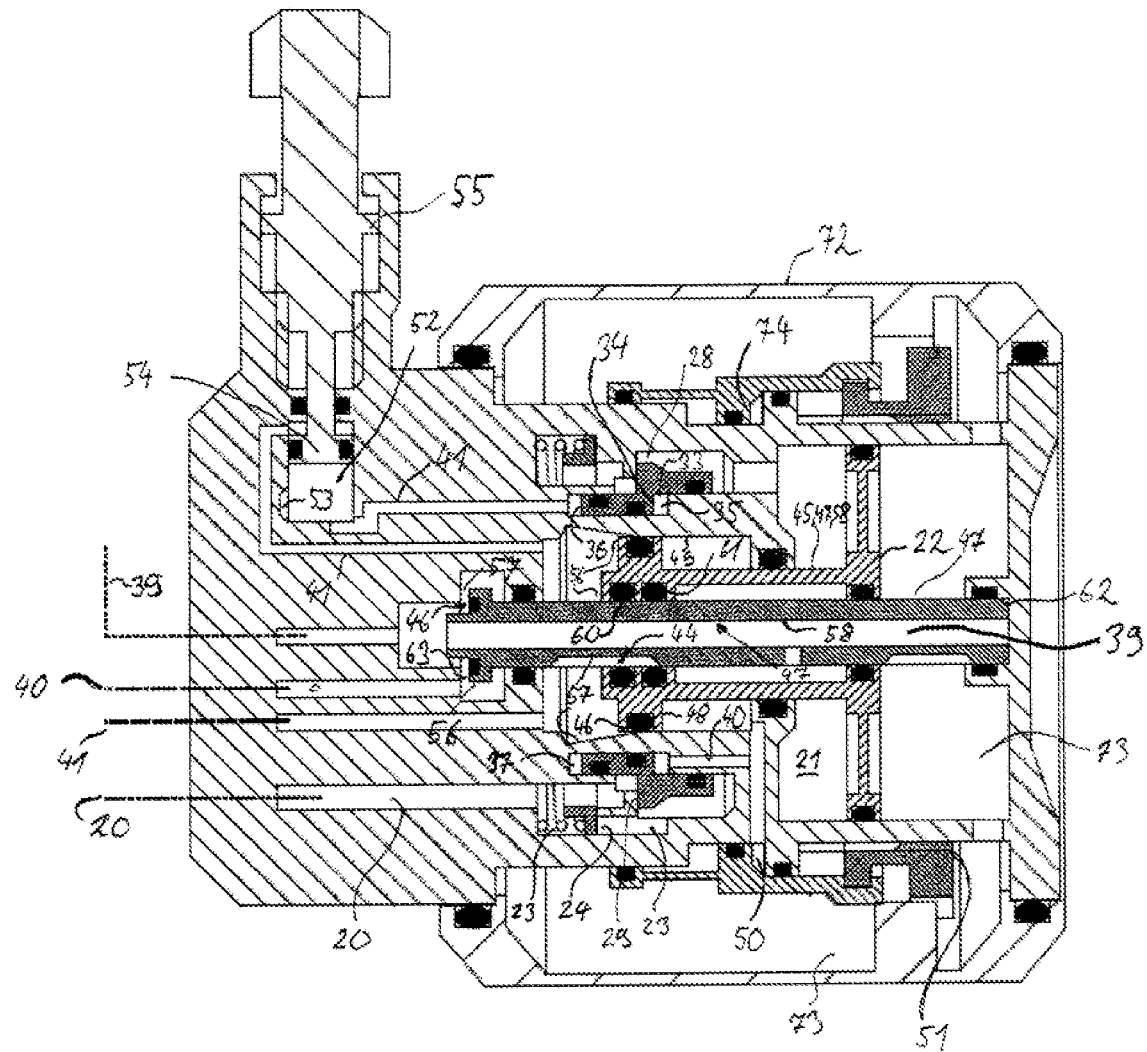
FIGS. 11 and 13 show detail representations of FIG. 10, and FIGS. 14 to 17 show cross-sections through a damping strut with a damping piston rod and through a disk valve as embodiments of the inventive damping strut.
Figure 12:
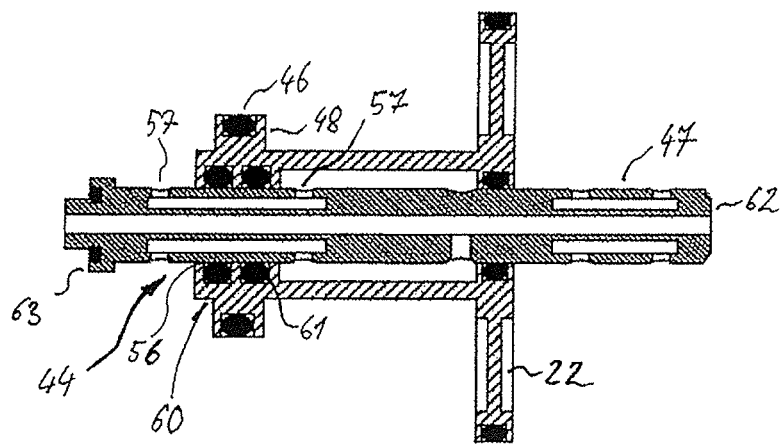
Figure 13:
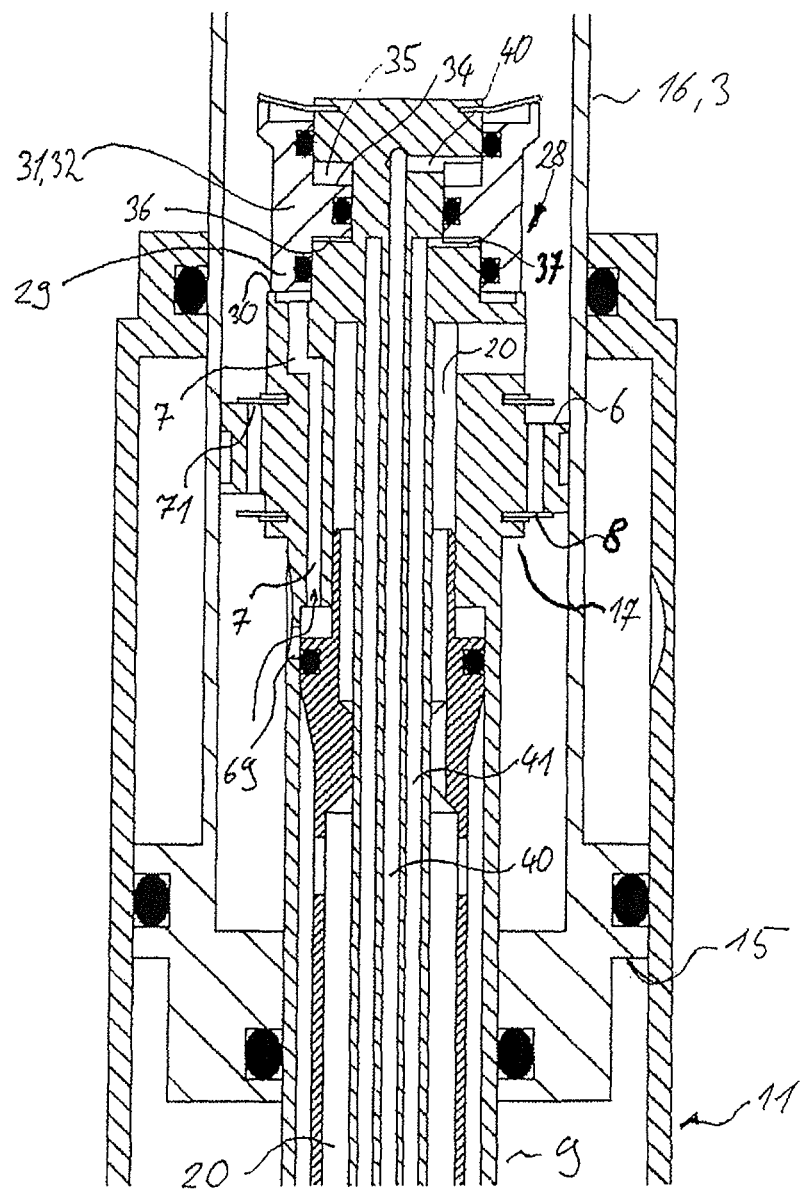

The damping strut 1 of FIG. 10, with detailed illustrations in FIGS. 11 to 13, represents a combination of the compression and rebound stage according to the scheme of FIGS. 2 and 5. The disk valve 28 and the control piston 31 of the rebound stage are arranged directly on the damping piston 6, concentrically with the piston rod 9. The disk valve 28 acts in series with a rebound stage adjustment valve 69 which is adjustable manually on the outside of the damping strut 1 by the rider via a rebound stage adjuster 70, and acts in parallel with a sprung disk valve 71 mounted on the damping piston 6.

The positive slider 46, the positive slider linkage 47, the negative slider 44, the negative slider linkage 45 of both the compression and rebound stages, the disk valve 28, the control piston 31 and the positive variation volume 50, the return valve 24 of the compression stage, the slip clutch 60 and the push rod 58 of the rebound stage are also particularly advantageously arranged concentrically with one another within a cylindrically formed pressure chamber 73 mounted externally on the damping strut 1, wherein the rotary sleeve 72 of the pressure chamber 73 arranged rotatable without pressure by the rider, moves the positive variation screw 51 radially via radial toothing, said positive variation screw 51, on rotation of the sleeve 72, displacing the positive variation piston which is configured as an annular piston and also, due to the arrangement and size of the effective surfaces thereof, is displaceable without force within the pressure chamber 73 in the unloaded state of the damping strut 1, so that a changing positive variation volume 50 is produced.

In this arrangement, the positive slider linkage 47 is simultaneously configured as the push rod 58 and as the positive slider linkage 47 of the rebound stage actuated by the slip clutch 60. The slip clutch 60 with the O-rings 61 is also the negative slider 44 with the slider aperture 57 and the slider plate 56 of both the rebound and the compression stages, wherein the negative slider 44 is also formed as the positive slider piston 48 which, with the partially conically formed outer casing of the positive slider cylinder 49, also comprises the positive slider 46 of the compression stage.

Particularly advantageously, the positive slider linkage 47 of the rebound stage is also configured with the stops 63 and 62 thereof as the pressure application line 39, such that said line is surrounded from both end faces at both stops 62 and 63 by the same ambient pressure and is configured such that the two end faces have equal areas so that the positive slider linkage 47 is movable almost without force in each pressure state of the gas pressure application device and is thus easily displaceable at any time by the small forces of the slip clutch 60.

Figure 14:
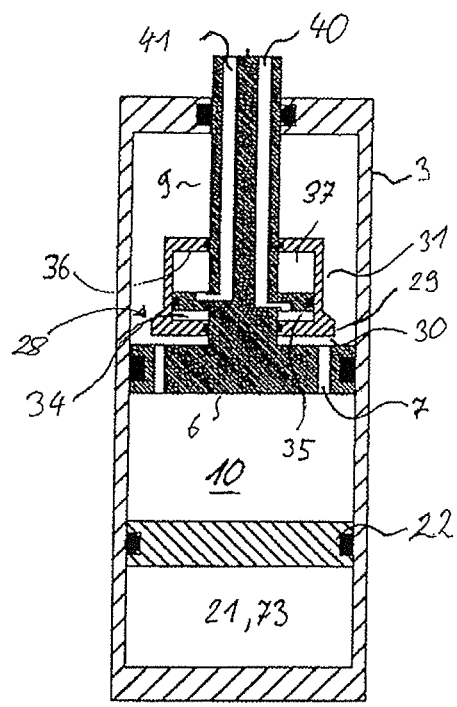
Figure 15:
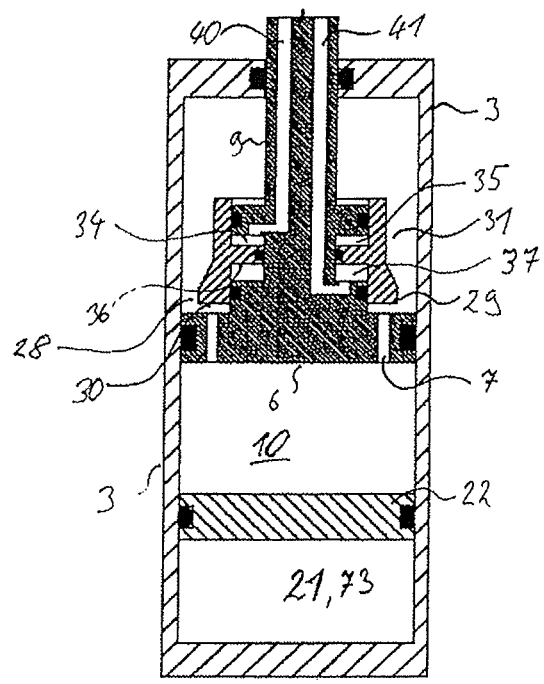
Figure 16:
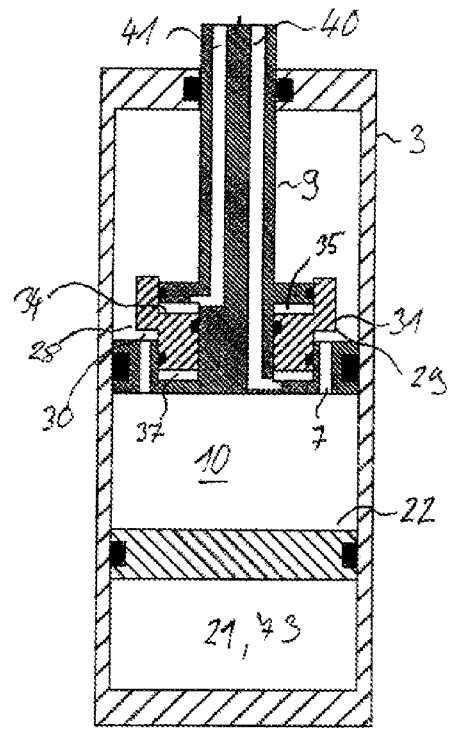

FIGS. 14-17 disclose different embodiments of the control piston 31 with the disk valve 28. In FIGS. 14 to 16, the control piston 31 is configured such that the positive side 34 and the negative side 36 to which control fluid is applied via the positive line 40 and the negative line 41 are equal-sized and the outer volume of the control piston 31 surrounded by the damping fluid does not change in relation to the damping fluid and thus the damping volume 10 is not changed by the displacement thereof. A control piston 31 configured in this way is therefore independent of, particularly static, fluid pressures within the damping fluid, as applied, for example, by the separating element 22 of the pressure chamber 73 to the damping fluid.

Figure 17:
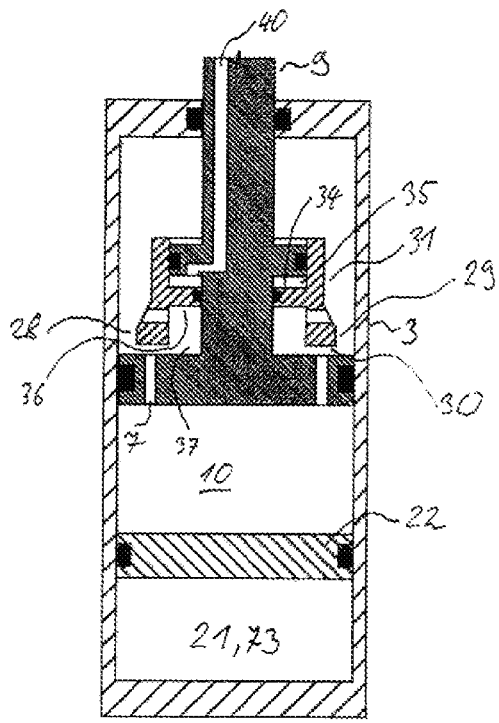

FIG. 17 shows an embodiment of the control piston 31, to which, on the positive side 34, the pressure of the control fluid and, on the negative side 36, via the separating element 22 and the damping fluid, the pressure of the pressure chamber 73 is applied. In this arrangement, the pressure application device controls only the pressure in the positive chamber 35.

The above description of preferred embodiments has been given by way of example. From the disclosure given, those skilled in the art will not only understand the present invention and its attendant advantages, but will also find apparent various changes and modifications to the structures disclosed. The applicant seeks, therefore, to cover all such changes and modifications as fall within the spirit and scope of the invention, as defined by the appended claims, and equivalents thereof.

The invention claimed is:

1. A damping strut for a bicycle, having a hydraulic shock absorber comprising:
   a damping cylinder comprising a damper volume filled with an incompressible damping fluid;
   a damping piston displaceably arranged in the damping cylinder;
   a pressure application device configured to detect a displacement of the damping piston with the damping cylinder;
   at least one disk valve configured such that when the damping piston is displaced, the damper volume changes such that the incompressible damping fluid flows through the at least one disk valve creating a damping force which counteracts the displacement; and
   a control piston coupled to the disk valve and configured to vary an opening degree of the disk valve,
   wherein the pressure application device comprises a slider having a slider aperture,
   wherein the slider is configured to be displaced in correspondence with the detected displacement of the damping piston such that the slider aperture permits selective application, with a compressible control fluid, of a pressure to the control piston depending on the displacement state detected by the pressure application device, such that on detection of a pre-determined displacement state of the damping strut by the pressure application device, the disk valve is pre-tensioned in a closing direction thereof, such that the damping force is increased, and
   wherein the pressure application device is configured to detect the displacement of the damping piston relative to the damping cylinder via a mechanical coupling between the slider and the damping piston, a hydraulic coupling between the slider and the incompressible damping fluid, or a hydraulic coupling between an electronic displacement sensor and the incompressible damping fluid.

2. The damping strut as claimed in claim 1, wherein the pressure application device comprises a control fluid reservoir configured such that the pressure of the control fluid increases with decreasing stroke of the damping strut.

3. The damping strut as claimed in claim 2, further comprising a gas pressure spring connected in parallel with the hydraulic shock absorber and a spring volume which is filled with a compressible spring fluid, wherein the spring fluid is the control fluid and the spring volume is the control fluid reservoir.

4. The damping strut as claimed in claim 2, wherein the control piston has a positive side, at which the pressure of the control fluid increases the pre-tension of the disk valve in the closing direction thereof, and a negative side, at which the pressure of the control fluid lessens the pre-tension of the disk valve in the closing direction thereof.

5. The damping strut as claimed in claim 4, wherein the control fluid is applied to the control piston by the pressure application device such that, on the displacement of the damping piston before the detection of the pre-determined displacement state, a pressure difference in the control fluid across the control piston is constant and, once the pre-determined displacement state is detected, the pressure difference increases according to a degree of collapse of the damping strut.

6. The damping strut as claimed in claim 4, wherein from a zero position of the damping strut as far as the detection of the pre-determined displacement state, a pressure difference of the control fluid across the control piston is constant.

7. The damping strut as claimed in claim 4, wherein the negative side is exposed to the atmosphere such that the disk valve is pre-tensioned with the control piston.

8. The damping strut as claimed in claim 4, wherein a surface area of the positive side is greater than a surface area of the negative side, such that the disk valve is pre-tensioned with the control piston.

9. The damping strut as claimed in claim 4, wherein the pressure application device comprises a further control fluid reservoir with which control fluid under pressure can be applied to the control piston, such that the disk valve is pre-tensioned with the control piston.

10. The damping strut as claimed in claim 4, wherein the pressure application device comprises a positive slider linkage, and
    wherein the slider is a positive slider having open and closed slider positions, the slider being arranged at the positive side for applying pressure to the control piston such that through actuation of the positive slider linkage while separating the positive side from the control fluid reservoir, a positive volume is isolated at the positive side with the positive slider.

11. The damping strut as claimed in claim 4,
    wherein the pressure application device comprises a negative slider linkage, and
    wherein the slider is a negative slider, which has open and closed slider positions and is arranged at the negative side for applying pressure to the control piston such that, by actuating the negative slider linkage while separating the negative side from the control fluid reservoir, a negative volume is isolated at the negative side with the negative slider.

12. The damping strut as claimed in claim 10, wherein the pressure application device comprises a volume adjustment device for the positive volume with which the volume of the positive volume can be adjusted.

13. The damping strut as claimed in claim 11, wherein the pressure application device comprises a volume adjustment device for the negative volume with which the volume of the negative volume is adjusted.

14. The damping strut as claimed in claim 10, wherein the pressure application device comprises a positive slider piston with which the positive volume is delimited and which constitutes the positive slider, wherein when the positive slider linkage is actuated, the positive volume in the collapsing damping strut is lessened.

15. The damping strut as claimed in claim 10, wherein on displacement of the damping piston with the damping cylinder, the positive slider linkage is actuated.

16. The damping strut as claimed in claim 11, wherein on displacement of the damping piston with the damping cylinder, the negative slider linkage is actuated.

17. The damping strut as claimed in claim 15, wherein the shock absorber further comprises a damping piston rod with which the damping piston is displaceable from outside the damping cylinder and, on displacement of the shock absorber with the damping piston rod, the positive slider linkage is actuated.

18. The damping strut as claimed in claim 16, wherein the shock absorber further comprises a damping piston rod with which the damping piston is displaceable from outside the damping cylinder and, on displacement of the shock absorber with the damping piston rod, the negative slider linkage is actuated.

19. The damping strut as claimed in claim 15, wherein the shock absorber comprises an equalization chamber linked to the damping cylinder in damping fluid-conducting manner and for volume equalization of the temporally variable displacement of the damping fluid via the damping piston rod on displacement of the damping strut, and
   wherein on displacement of the shock absorber, the positive slider linkage is driven due to the flow resistance generated at a constriction by the displaced damping fluid.

20. The damping strut as claimed in claim 16, wherein the shock absorber comprises an equalization chamber linked to the damping cylinder in damping fluid-conducting manner and for volume equalization of the temporally variable displacement of the damping fluid via the damping piston rod on displacement of the damping strut, and
   wherein on displacement of the shock absorber, the negative slider linkage is driven due to the flow resistance generated at a constriction by the displaced damping fluid.

21. The damping strut as claimed in claim 10, wherein the pressure application device further comprises a negative slider linkage and wherein the slider is a negative slider, having open and closed slider positions, and being arranged at the negative side for applying pressure to the control piston such that, by actuating the negative slider linkage while separating the negative side from the control fluid reservoir, a negative volume can be isolated at the negative side with the negative slider.

22. The damping strut as claimed in claim 17, wherein the disk valve is arranged in the inflow for the damping fluid to the equalization chamber.

23. The damping strut as claimed in claim 10, wherein the disk valve is arranged at the damping piston in series with a damping aperture of the damping piston.

24. The damping strut as claimed in claim 10, wherein the pre-determined displacement state is a pre-determined stroke value of the shock absorber and the positive linkage is configured to bring about a change in the slider position on detection of the stroke value.

25. The damping strut as claimed in claim 11, wherein the pre-determined displacement state is a pre-determined stroke value of the shock absorber and the negative linkage is configured to bring about a change in the slider position on detection of the stroke value.

26. The damping strut as claimed in claim 10, wherein the pre-determined displacement state is a direction change during displacement of the shock absorber and the positive linkage is configured to bring about a change in the slider position on occurrence of the direction change.

27. The damping strut as claimed in claim 11, wherein the pre-determined displacement state is a direction change during displacement of the shock absorber and the negative linkage is configured to bring about a change in the slider position on occurrence of the direction change.

28. The damping strut as claimed in claim 21, wherein the shock absorber further comprises a separating element which is displaceably arranged in an equalization chamber linked to the damping cylinder and with which the equalization chamber is delimited,
   wherein the volume equalization can be brought about by the displacement of the separating element, and
   wherein on displacement of the shock absorber, at least one of the positive slider linkage and the negative slider linkage is driven with the separating element.

* * * * *